United States Patent Office 3,708,364
Patented Jan. 2, 1973

3,708,364
NON-IONIC SURFACE-ACTIVE AGENTS DERIVED FROM FATTY CHAIN DIOLS AND METHOD OF PREPARING SAME
Gregoire Kalopissis, Paris, and Guy Vanlerberghe, Mitry-Mory, France, assignors to Société Anonyme dite: l'Oreal, Paris, France
No Drawing. Continuation-in-part of application Ser. No. 652,005, July 10, 1967. This application July 6, 1970, Ser. No. 52,740
Int. Cl. C11d 1/66, 3/075, 7/06
U.S. Cl. 252—156                    9 Claims

ABSTRACT OF THE DISCLOSURE

A composition containing high temperature, stable, water soluble, non-ionic surface active compounds having the formula:

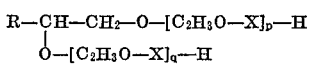

in which R represents a lipophilic group having 8 to 22 carbon atoms, which may include hydroxyl groups and intermediate groups comprising hetero atoms, such as O, S and N, X represents a CH$_2$OH or

CH$_2$O—CH$_2$—CHOH—CH$_2$OH group, $p$ and $q$ are numbers equal to or less than 10, the sum $(p+q)$ being equal to or greater than 1 but no greater than 10.

SUMMARY OF THE INVENTION

This application is a continuation-in-part of our copending application S.N. 652,005, filed July 10, 1967.

There are a large number of known non-ionic surface-active agents that are commercially available, the composition and properties of which are quite varied. However, none of these known agents made from currently available raw materials have all of the characteristics required for a considerable number of applications.

Thus, for example, in the case of ethylene oxide derivatives, an increase in the cloud point to 100° C. or more results in a very marked decrease in their effectiveness as wetting agents or detergents.

Polyhydroxylated non-ionic surface-active agents are also well known.

These surface active agents are usually prepared by reacting a lipophilic compound with hydrosoluble polyols or sugars. This process produces mixtures of constituents having one or more lipophilic chains per molecule which must be subjected to onerous purifying steps when these products are to be used for purposes which require complete solubility in water.

By introducing hydrophilic substituents on the hydrocarbon chain or adding ethylene oxide to the free hydroxyl groups, the solubility of these compounds in water may be improved.

But because they consistently comprise an ester bond between the lipophilic chain and the hydrophilic component, the resulting compounds are easily hydrolysed in an alkaline medium.

The purpose of the present invention is to provide non-ionic surface active agents which are both stable and soluble in water at high temperatures even in the presence of electrolytes and which have very valuable surface active properties.

The object of the present invention is to provide a process of manufacturing new non-ionic surface active agents having the following formula:

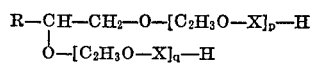 (I)

in which R represents a known lipophilic group, such as a linear or branched hydrocarbon comprising 8 to 22 carbon atoms, which may include hydroxyl or —CHOH— groups and intermediate groups comprising hetero atoms, such as O and N or —CONH—, X represents a CH$_2$OH or CH$_2$O—CH$_2$—CHOH—CH$_2$OH group, $p$ and $q$ are numbers equal to or less than 10, and the sum $n$ which is $(p+q)$ being equal to or greater than 1 but no greater than 10, said process being essentially characterized by the fact that it comprises the step of polycondensing with an α-diol having the formula:

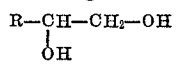

in which R has the significance set forth above, $n$ molecules of glycerol epihalohydrin or allyl-glycidylether, and hydroxylizing the resulting product.

Another object of the present invention is to provide the new article of manufacture which consists of the non-ionic surface active agent of Formula I which is obtained by carrying out the above process.

The last object of the present invention is to provide as new articles of manufacture the intermediates which are obtained by carrying out the above process, after completion of the polycondensation step and before hydroxylation, said intermediates responding to the following formula:

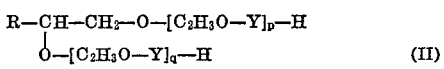 (II)

in which R, $p$ and $q$ have the significances herein before set forth and in which Y represents a CH$_2$Z radical or a CH$_2$OCH$_2$—CH=CH$_2$ radical, Z being a halogen.

The preferred new compounds of this invention have the following formula:

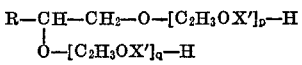

in which

R is selected from the group consisting of alkyl, alkenyl, alkoxyalkyl, alkoxyalkenyl and alkyl-aryl-oxyalkyl, in which the aryl group is preferably benzyl, having 8 to 22 carbon atoms, X' is selected from the group consisting of CH$_2$OH and CH$_2$OCH$_2$—CHOH—CH$_2$OH, and $p$ and $q$ are numbers less than 11, the sum $(p+q)$ being at least equal to one and less than 11.

During the polycondensation step which constitutes the first step of the process according to the invention, a mixture of compounds, all of which respond to Formula II, is formed. For each of these the total number of

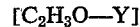

groups attached to the two alcohol functions of the α-diol employed may be greater or less than the statistical average value of the number of molecules of allyl-glycidyl-ether or glycerol epihalohydrin used per molecule of α-diol. The process according to the invention thus makes it possible to obtain a mixture of compounds in which the importance of the hydrophilic chains is dependent on the value of the sum $(p+q)$ of the parameters $p$ and $q$ of the Formula I the group of values of $(p+q)$ being statistically distributed about an average value corresponding to the number of molecules used per molecule of alcohol. But the important fact which should be emphasized and which leads to one of the essential advantages of the process of preparation according to the invention is that this process leads to the formation of compounds having a single lipophilic chain for each hydrophilic chain. The result is that the hydrophilic property of the resulting mixture is greatly increased.

It should moreover be noted that the process of the invention makes it possible to regulate at will both the hydrophilic and lipophilic properties of the product obtained. In effect, the hydrophilic property of the compounds may be regulated by selecting the value of the number of molecules which are polycondensed with each molecule of α-diol, and their lipophilic property may be regulated by selecting the length and nature of the hydrocarbon or other lipophilic chain of the α-diols used to make the compound.

These diols may be prepared by hydroxylation, in accordance with known prior art processes, from long-chain α-olefins in pure form or in commercial mixtures.

The process according to the invention is also applicable to hydroxyl compounds having mixed functions such as the alkoxy-alkanediols or the alkyl-aryl-oxyalkanediols. These include the glycerol monoethers such as the lauryl-, tetradecyl-, hexadecyl-, octadecyl-, octadecenyl-, octylphenyl-, and nonyphenyl-monoethers of glycerol.

An illustrative list of preferred alpha diols having the Formula R—CHOH—CH$_2$OH, in which R is said alkyl group defined above includes:

1,2-decanediol
1,2-undecanediol or 1,2-hendecanediol
1,2-dodecanediol
1,2-tridecanediol
1,2-tetradecanediol
1,2-pentadecanediol
1,2-hexadecanediol
1,2-heptadecanediol
1,2-octadecanediol
1,2-nonadecanediol
1,2-eicosanediol
1,2-heneicosanediol
1,2-docosanediol
1,2-isododecanediol In general 1,2-alkanediol mixtures can be obtained by hydroxylation of the alpha-olefines in oxygenated water in the presence of formic acid or acetic acid.

One can also transform in a known manner by hydrolysis, the alpha-olefines or 1,2-epoxides to alpha-diols.

The chlorohydrins of the general formula

R—CHOH—CH$_2$Cl

R designating a hydrocarbon with 8 to 22 carbon atoms, can be converted by saponification to alpha-diols. These chlorohydrins are prepared by adding hypochloric acid to the alpha-olefines.

The alpha-olefins are obtained:

either by cracking of hydrocarbons of petroleum origin. In this case they have an even or odd number of carbon atoms, the most in the right chain. The industrial mixtures of this type also have olefins with a ramified chain and naphtenic hydrocarbons, or
by polymerization of ethylene, or
by pryolysis of fatty alcohols or their esters.

Preferred 1,2-alkoxyalkyldiols and 1,2-alkyl-aryloxyalkyldiols include:

diol compounds of the formula

R'OCH$_2$—CHOHCH$_2$OH—

and R' can be n-dodeceyl,
n-tetradecyl, n-hexadecyl, n-octadecyl,
n-octadecenyl, 2-methyldecyl,
2-methyldodecyl, 2-methyltridecyl,
2-methyltetradecyl,
3,7,11,15-tetramethylhexadecyl,
2,3,5,7-tetramethylnonyl
2,4,7-trimethylnonyl, 2-octyldodecyl, 2-hexyldecyl,
p-ter-octyl-phenyl,

p-sec-octyl-phenyl,
p-isononyl-phenyl,
p-tert-dodecyl-phenyl, and
p-isododecyl-phenyl.

These compounds can be used in the pure state or in a mixture form—

By hydrolysis of glycidylethers with a linear or branched chain fatty alcohols, or alkylphenyl glycidylethers having the general formula:

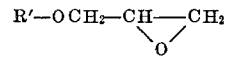
R'—OCH$_2$—CH——CH$_2$
         \\O/ or by saponification of chlorohydrines

R'—OCH$_2$CHOH—CH$_2$Cl or by hydroxylation of allylic ethers R'—OCH$_2$CH=CH$_2$. R' has the meaning defined above.

In the particular case where one effects a polyaddition of glycidylether allyl, in the presence of a basic catalyst, one can use alpha-diols having heteroatoms which are sulfur (thioethers) or nitrogen in the form of an amide intermediate group.

Such compounds are represented by the general formulas:

(A) R''—S—CH$_2$—CHOH—CH$_2$OH which are alkyl 3-thio 1,2-propanediols.
(B) R''—S—CH$_2$—CH$_2$—CHOH—CH$_2$OH which is a 4-alkylthio 1,2-butanediols, and R'' is an alkyl group which has 8–18 carbon atoms.
(C) R'''—CONH—CH$_2$—CHOH—CH$_2$OH.

These amides are obtained by condensation of fatty acids with 3-amino-1,2-propanediols.

R''' is a hydrocarbon remainder of fatty acid which has 8 to 22 carbon atoms.

In the particular case where the products of the invention are obtained by polyaddition of allyl-glycidylether on an 3-alkenyloxy 1,2-propanediol and by hydroxylation with the help of an organic peracid, the alkenyl radical is hydroxylized at the same time as the allyl radical.

For example, the octadecenyl radical has a double link in position 9 and is transformed in octadecyl-9,10-dihydroxy radical.

It results that in this illustrative case, that the R radical has as substituents adjacent hydroxyl and an oxygen heteroatom.

In the method of manufacture according to the invention the polycondensation step may be carried out in the presence of an acid catalyst such as boron fluoride, stannic chloride or antimony pentachloride, or when using allyl glycidylether, in the presence of a catalyst such as triethylamine. This reaction is carried out at a temperature between 25° C. and 160° C. and preferably between 40° and 100° C.

When glycerol epihalohydrin is reacted during the polycondensation step, the hydroxylation reaction which constitutes the second step of the process is based on the reaction of the halogenated derivative obtained during the polycondensation step with an alkaline carboxylic salt, preferably in a solvent which insures the miscibility of the reagents and the ready separation of the mineral halide formed. This hydroxylation reaction takes place between 130° C. and 230° C., and preferably about 180° C.

When allyl-glycidyl-ether is reacted during the polycondensation step, hydroxylation is preferably effectuated by means of an organic peracid formed in situ from hydrogen peroxide and an organic acid such for example, as acetic acid or formic acid. This reaction is carried out between 20° C. and 80° C. and preferably between 30° C. and 50° C.

The resulting compounds of Formula I may be used as wetting agents, detergents, or foaming agents. They have particularly valuable properties with respect to solubility. They are compatible with aqueous concentrated sodium hydroxide solutions (for example up to 40% by weight), and for this reason have many possible industrial applications, particularly in cleaning, metal descaling, and degreasing operations carried out at high temperatures and in the presence of electrolytes.

It should also be noted that, as compared with non-ionic surface active agents derived from ethylene oxide and comprising an analogous lipophilic chain, the compounds according to the invention have the advantage of being very effective wetting agents even though they remain soluble in water at high temperatures, even in the presence of electrolytes.

The following table gives several wetting times at 25° C. measured according to the "Canvas Disk" method described in J. C. Harris' publication "Detergency Evaluation and Testing." The tests were carried out with solutions containing 1% of the product to be tested in demineralized water.

and

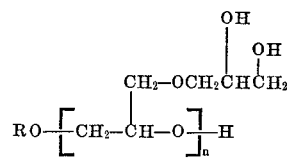

in which R is a lypophile group which has 8–22 carbon atoms, respectively. Other types of known non-ionic surface active agents can also be used in these compositions.

In order that the invention may be better understood, several methods of preparing the compounds according to the invention will now be described, purely by way of illustration and example.

| | Cloud point, ° C. | | |
| --- | --- | --- | --- |
| Compound subjected to tests | In distilled water | In salt water (10% NaCl) | Wetting time |
| $R-(OCH_2CH_2)_n-OH$ with $n=23$; R=a lauryl radical. | >100 | 81 | >5 minutes. |
| $R-CH-CH_2O-[C_2H_3O(CH_2OH)]_p-H$ <br> $\quad \mid$ <br> $\quad O-[C_2H_3O(CH_2OH)]_q-H$ <br> with $p+q=3.5$; R=alkyl radical comprising 9 to 13 carbon atoms. | >97.5 | >97.5 | 20 seconds. |
| $C_{12}H_{25}-CH-CH_2-[C_2H_3O(CH_2OH)]_p-H$ <br> $\quad \mid$ <br> $\quad O-[C_2H_3O(CH_2OH)]_q-H$ <br> with $p+q=3.5$ | >98 | >98 | 24 seconds. |

Another object of the invention is to provide a cleansing, a shampooing or a detergent composition essentially characterized by the fact that it contains at least one compound according to Formula I.

The detergent compositions according to the invention are preferably aqueous solutions or pastes containing about 1 to 50% of compounds according to Formula I which have a pH of about 3–9. These solutions may also include products or additives customarily used in such industrial products, as for example, thickening agents, sequestrants, anti-setting agents, etc., and mineral products (such as mineral oil) or ionic or non-ionic surface active agents other than those responding to Formula I.

The preferred and more commonly used detergent composition additives include cethyl - trimethyl - ammonium bromide, diethanolamide of copra, polyethylene glycol, lauryl sulfate, sodium salt of ethoxyl alkyl sulfate, lauryl diethanolamide, oxyethylenated lauryl alcohol, carboxymethylcellulose, lactic acid, paraffin oil, glycerol monostearate, neohexadecyl stearate, vaseline, perhydrosqualene, isopropyl palmitate and propylene glycol.

Other non-ionic surface active agents can include those described in applications S.N. 780,300, filed Nov. 29, 1968, and S.N. 763,340, filed Sept. 27, 1968 which have the general formulas:

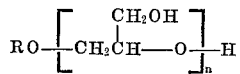

EXAMPLE I

Preparation of the compound having the formula:

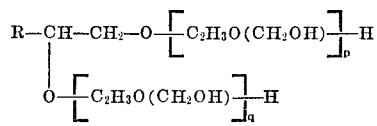

in which R represents a mixture of linear alkyl chains having 9 to 13 carbon atoms, the sum $(p+q)$ having a statistical average value of 3.5.

FIRST PHASE: POLYCONDENSATION REACTION

The starting material is an α-diol obtained by hydroxylation in accordance with the method described in Swern's "Organic Reactions," vol. VII, at page 399, beginning with a mixture of straight chain olefins comprising 11 to 15 carbon atoms and sold commercially under the trademark "Chevron Alpha Olefins," by the Cronite Company.

0.25 ml. of an acetic composition containing 36% of $BF_3$, is added to 44 g. of α-diol obtained in this manner, which has first been distilled at between 140 and 153° C. under a pressure of 1 mm. of mercury and melted at the moment of use. 65 g. of glycerol epichlorohydrin is then poured in. The reaction lasts 50 minutes, during which the temperature is kept between 40 and 50° C.

This yields a polychlorinated polyether.

SECOND PHASE: HYDROXYLATION REACTION

The polychlorinated ether obtained during the first step is hydroxylated with potassium acetate, using dipropylene glycol as a solvent and maintaining the temperature at 180° C. for three hours. The resulting potassium chloride is filtered, the solvent is evaporated, and after subsequent ethanolysis the product having the formula given at the beginning of the example is obtained.

This product is in the form of a yellowish syrup, the cloud point of which in 0.5% solutions, has already been given. This product is compatible with aqueous solutions containing 30% by weight of sodium hydroxide. At a concentration of 1% in a 10% sodium hydroxide solution, the product retains its wetting properties (wetting time at 25° C.=140 seconds).

EXAMPLE II

Preparation of the compound having the formula:

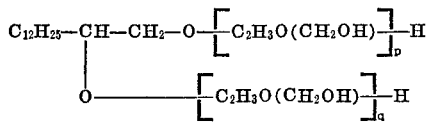

in which formula the sum $(p+q)$ has a statistical average value of 3.5.

The starting material is 1,2-tetradecane diol, prepared by hydroxylation of 1-tetradecene by the method described by Swern in "Organic Reactions," vol. VII at page 399. The 1-tetradecene used to prepare the 1,2-tetradecanediol is a commercial product sold by the Gulf Oil Corporation.

FIRST PHASE: POLYCONDENSATION REACTION 0.20 ml. of an acetic composition containing 36% $BF_3$ is added to 34.5 g. of distilled α-diol having a boiling point of 160° C. at a pressure of 1 mm. of mercury, which was melted at the moment of use. 48.5 g. of glycerol epichlorohydrin is added, while the mixture is agitated. The temperature is kept between 40 and 50° C. and the reaction lasts for 45 minutes.

The result is a polychlorinated polyether.

SECOND PHASE: HYDROXYLATION REACTION 72 g. of the product obtained in this manner is treated with 45 g. of potassium acetate, 120 g. of dipropyleneglycol being used as solvent. The hydroxylation reaction is carried out at 180° C. and lasts three hours. The potassium chloride thus obtained is filtered; the solvent is evaporated; and subsequent ethanolysis yields the product having the formula given at the beginning of this example.

This product is in the form of a very viscous yellow syrup which is easily dissolved in water. Its cloud point, determined for an 0.5% solution, is above 98° C. both in distilled water and in salt water containing 10% sodium chloride. This product, mixed with a 30% by weight aqueous solution of sodium hydroxide, gives a paste suitable for descaling metal.

EXAMPLE III

Preparation of the compound having the formula:

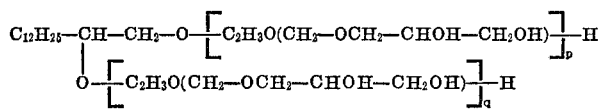

in which formula the sum $(p+q)$ has a statistical average value of 1.75.

FIRST PHASE: POLYCONDENSATION REACTION

The starting material used is 1,2 tetra-decanediol prepared by hydroxylizing 1-tetradecene by the method described in Swern's "Organic Reactions," vol. VII, at page 399. The 1-tetradecene used to prepare the 1,2-tetradecanediol is sold commercially by Gulf Oil Corporation.

0.1 ml. of an acetic composition containing 36% $BF_3$ is added, while stirring, to 27.5 g. of 1,2-tetradecanediol distilled at 160° C. under a pressure of 1 mm. of mercury, and melted at the moment of use. 24 g. of allyl-glycidyl-ether is then added drop by drop while maintaining the temperature at about 60° C. The reaction lasts for about 35 minutes.

SECOND PHASE: HYDROXYLATION REACTION 48 g. of the product thus obtained is dissolved in 55 g. of 98% formic acid and 25 ml. of hydrogen peroxide at 116 volumes is then added progressively. After a reaction lasting for 27 hours at 40° C. those peroxides formed are destroyed with sodium sulfite and the formic acid is evaporated.

This is followed by ethanolysis, which results in a colorless semi-solid product. This product dissolves readily in water and is a good foaming agent. In an 0.5% solution it has a cloud point above 97° C. both in distilled water and in salt water containing 10% sodium chloride.

EXAMPLE IV

Preparation of the composition having the formula:

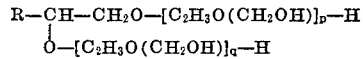

in which R designates a mixture of alkyl radicals containing 13 to 18 carbon atoms, the sum $p+q$ having a statistical average value of 6.

First phase: The starting material used is a mixture of α-diols obtained by hydroxylizing with hydrogen peroxide, in a medium containing formic acid and ethyl formate, a mixture of olefins comprising 15 to 20 carbon atoms and sold commercially under the trademark "Chevron Alpha Olefins" by the Oronite Company.

0.40 ml. of an acetic composition containing 36% $BF_3$ is added to 73 g. of α-diols recrystallized in petroleum ether and melted at the moment of use. 139 g. of glycerol epichlorohydrin is then added drop by drop. The operation takes 45 minutes and the temperature is kept between 60 and 75° C.

The reaction is terminated by adding an additional 0.1 ml. of the acetic composition containing boron fluoride, while heating in a boiling water bath for about an hour.

This results in a liquid polychlorinated polyether which is yellow in color.

Second phase: 123.5 g. of anhydrous potassium acetate and 0.9 g. of potassium borohydride is dissolved in 300 g. of dipropyleneglycol. The resulting solution is heated to 175–180° C. and 177.5 g. of the polychlorinated polyether prepared in the first step is added thereto. After a reaction lasting 3 hours at 180° C. the potassium chloride formed is filtered and the solvent is evaporated. The product is de-acetylated by ethanolysis.

The resulting product is in the form of a paste which is soluble in water. The cloud point in the case of 0.5% solutions, both in distilled water and in salt water containing 10% of sodium chloride, is above 100° C. This compound is soluble in a 40% sodium hydroxide solution.

Several examples of useful compositions including the compounds according to the invention will now be given:

EXAMPLE V

A gel cleansing composition is prepared in the following manner—

To 10 grams of the compound having the formula:

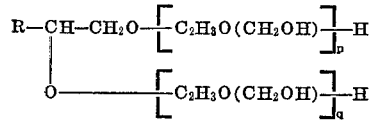

in which R represents a linear alkyl chain of from 9 to 13 carbon atoms the sum $(p+q)$ having a statistical average value of 3.5, are added 10 grams of a 30% soda lye.

After homogenization, a clear yellow gel is obtained. This compound may be used to clean household ovens. It is applied by means of a damp cloth.

EXAMPLE VI

A gel cleansing composition is prepared by mixing 10 grams of a 30% soda lye with 10 grams of the compound having the formula:

$$C_{12}H_{25}-\underset{\underset{O-[C_2H_3O(CH_2OH)]_q-H}{|}}{CH}-CH_2O-[C_2H_3O(CH_2OH)]_p-H$$

in which the sum $(p+q)$ has a statistical value of 3.5.

After homogenization, a clear yellow gel is obtained.

This gel is used to clean household ovens, being applied with a damp cloth.

EXAMPLE VII

An aqueous detergent solution having the following composition is prepared:

$$C_{12}H_{25}-\underset{\underset{O-[C_2H_3O(CH_2OCH_2-CHOH-CH_2OH)]_q-H}{|}}{CH}-CH_2O-[C_2H_3O(CH_2OCH_2-CHOH-CH_2OH)]_p-H$$

| | G. |
|---|---|
| The sum $(p+q)$ having a statistical average value of 1.75 | 10 |
| Cetyl-trimethyl ammonium bromide | 3 |
| Lactic acid q.s.p. (pH=5). | |
| Water, q.s.p. | 100 |

The hair is dampened and 10 cm.³ of the above composition is applied. The hair is rubbed vigorously, then rinsed thoroughly with water. A second application of from 8 to 10 cm.³ of the product is made; a generous lather results. The hair is again rinsed and then dried. The hair is shiny, soft and non-electric.

EXAMPLE VIII

An aqueous shampoo solution having the following formula is prepared:

$$C_{12}H_{25}-\underset{\underset{O-[C_2H_3O(CH_2OCH_2-CHOH-CH_2OH)]_q-H}{|}}{CH}-CH_2O-[C_2H_3O(CH_2OCH_2-CHOH-CH_2OH)]_p-H$$

| | G. |
|---|---|
| The sum $(p+q)$ having a statistical average value of 1.75 | 10 |
| Copra diethanolamide | 1 |
| Polyethylene glycol (molecular weight about 5,000,000) | 0.1 |
| Water, q.s.p. | 100 |

The resulting solution has a pH of 7.5.

For shampooing, the hair is first dampened and then 10 cm.³ of the above solution are applied with vigorous rubbing. The hair is thoroughly rinsed with water and a second application of from 8 to 10 cm.³ of the product is made. A generous lather results. The hair is rinsed and dried. Hair thus washed is shiny, soft and not electric.

It will of course be understood that the foregoing examples have been given purely by way of illustration and may be modified as to detail without thereby departing from the basic principles of the invention.

Other illustrative compounds of Formula I are:

$$C_8H_{17}-\underset{\underset{O-[C_2H_3O(CH_2OH)]_2-H}{|}}{CHCH_2O}-[C_2H_3O(CH_2OH)]_3-H$$

$$C_{22}H_{45}-\underset{\underset{O-[C_2H_3O(CH_2OCH_2CHOHCH_2OH)]_5-H}{|}}{CHCH_2O}-[C_2H_3O(CH_2OCH_2CHOHCH_2OH)]_4-H$$

$$C_{16}H_{29}-\underset{\underset{O-[C_2H_3O(CH_2OH)]_2-H}{|}}{CHCH_2O}-[C_2H_3O(CH_2OH)]_2-H$$

$$C_{18}H_{36}-\underset{\underset{O-[C_2H_3O(CH_2OH)]_2-H}{|}}{CHCH_2O}-[C_2H_3O(CH_2OH)]_3-H$$

$$C_8H_{17}OC_2H_4-\underset{\underset{O-[C_2H_3O(CH_2OH)]_3-H}{|}}{CHCH_2O}-[C_2H_3O(CH_2OH)]_2-H$$

$$C_{10}H_{21}OC_3H_5\underset{\underset{O-[C_2H_3O(CH_2OH)]_2-H}{|}}{CHCH_2O}-[C_2H_3O(CH_2OH)]_2-H$$

$$C_8H_{17}-\text{C}_6\text{H}_4-OC_2H_4-\underset{\underset{O-[C_2H_3O(CH_2OH)]_2-H}{|}}{CHCH_2O}-[C_2H_3O(CH_2OH)]_2-H$$

$$C_{10}H_{21}-\text{C}_6\text{H}_4-CH_2-O-CH_2\underset{\underset{O-[C_2H_3O(CH_2OH)]_4-H}{|}}{CHCH_2O}-[C_2H_3O(CH_2OH)]_3-H$$

$$C_{10}H_{21}-S-CH_2CH-CH_2O-\underset{\underset{O-[C_2H_3O(CH_2OCHCHOHCH_2OH)]_2-H}{|}}{}[C_2H_3O(CH_2OCH_2CHOHCH_2OH)]_3-H$$

$$C_{14}H_{29}-CONH-CH_2-\underset{\underset{O-[C_2H_3O(CH_2OH)]_3-H}{|}}{CHCH_2O}-[C_2H_3O(CH_2OH)]_5-H$$

$$C_{10}H_{21}-CHOH-CH_2-\underset{\underset{O-[C_2H_3O(CH_2OH)]_2-H}{|}}{CHCH_2O}-[C_2H_3O(CH_2OH)]_2-H$$

The carrier used in the cleaning compositions may be any carrier that does not react with the surface active compound of this invention. The carrier may be a gel, solvent, or a solid carrier that can be dispersed in an aqueous solution at the time of use.

What is claimed is:

1. A detergent composition consisting essentially of an aqueous solution or paste of a nonionic surface active compound of the formula $$R-\underset{\underset{O-[C_2H_3O-X]_q-H}{|}}{CH}-CH_2O-[C_2H_3O-X]_p-H$$

wherein R is a lipophilic group containing 8–22 carbon atoms and is selected from the group consisting of alkyl, alkenyl, alkoxy alkyl and alkoxy alkenyl, X is selected from the group consisting of —CH₂OH and

—CH₂OCH₂CHOHCH₂OH $p$ and $q$ are numbers equal to or less than 10, the sum of $(p+q)$ ranging from 1.75 to no greater than 10, said nonionic surface active agent being present in amounts of 1–50 weight percent of said composition.

2. The detergent composition of claim 1 wherein R is alkyl.

3. The detergent composition of claim 1 wherein R is alkenyl.

4. The detergent composition of claim 1 wherein the sum of $(p+q)$ is 1.75 to 6.

5. The detergent composition of claim 1 wherein said nonionic surface active compound has the formula

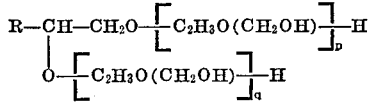

wherein R is a mixture of linear alkyl groups having 9–13 carbon atoms and the sum of $(p+q)$ has a statistical average value of 3.5.

6. The detergent composition of claim 1 wherein said nonionic surface active compound has the formula

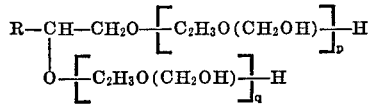

wherein R is $C_{12}H_{25}$ and the sum of $(p+q)$ has a statistical average value of 3.5.

7. The detergent composition of claim 1 wherein said nonionic surface active agent has the formula

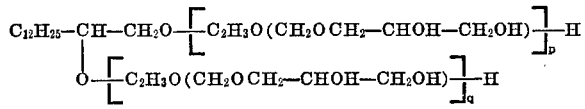

wherein the sum of $(p+q)$ has a statistical average value of 1.75.

8. The detergent composition of claim 1 containing up to 40 percent by weight of sodium hydroxide.

9. The detergent composition of claim 1 which also includes a material selected from the group consisting of ionic surface active agents and a second nonionic surface active agent.

References Cited
UNITED STATES PATENTS

| | | | |
|---|---|---|---|
| 3,578,719 | 5/1971 | Kalopissis et al. | 252—89 X |
| 3,427,248 | 2/1969 | Lamberti et al. | 252—121 X |

FOREIGN PATENTS

| | | | |
|---|---|---|---|
| 1,531,010 | 6/1968 | France | 260—615 |

HERBERT B. GUYNN, Primary Examiner

D. L. ALBRECHT, Assistant Examiner

U.S. Cl. X.R.

252—89, 135, 547, 548, DIG. 1, DIG. 13